United States Patent Office 3,194,652
Patented July 13, 1965

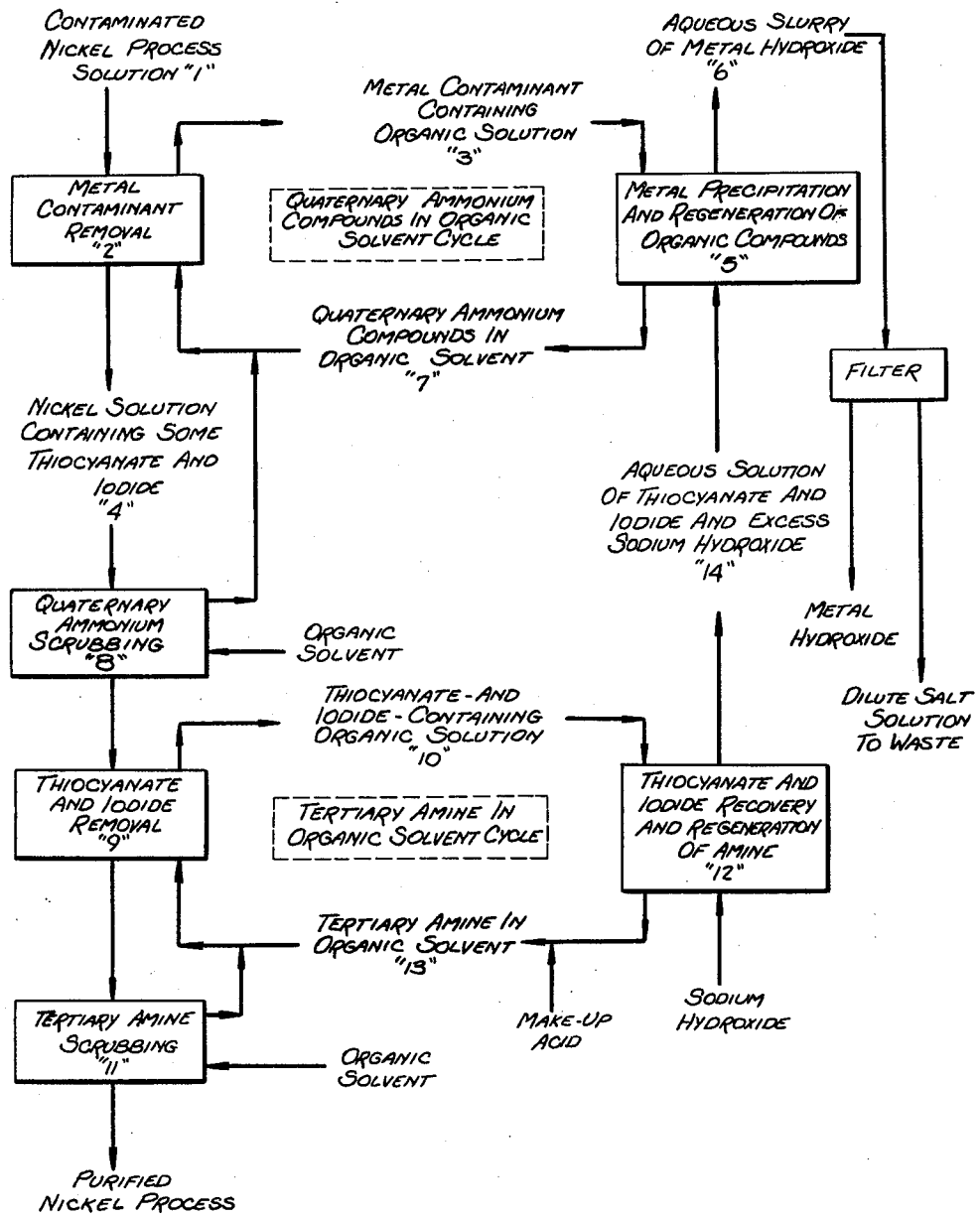

3,194,652
REMOVAL OF METAL CONTAMINANTS FROM NICKEL-CONTAINING PROCESS SOLUTIONS
Warren Eugene Clifford, San Francisco, and Leslie Andrew McClaine, San Rafael, Calif., James Henry Bryn George, Cambridge, Mass., and Charles E. O'Neill, Upper Montclair, N.J., assignors, by direct and mesne assignments, to The International Nickel Company, Inc., New York, N.Y., a corporation of Delaware
Filed Aug. 19, 1963, Ser. No. 302,778
19 Claims. (Cl. 75—119)

The present application is a continuation in part of our copending application Serial No. 120,759, filed June 29, 1961, now abandoned.

The present invention relates to the separation and separate recovery of nickel and other metals from process solutions and, more particularly, to the removal of metal contaminants from nickel-containing process solutions.

The contamination of nickel with one metal in particular, cobalt, has been a problem which has constantly confronted the art. Many attempts have been made to achieve separation of nickel and cobalt in process solutions. A good many of the processes developed for such a separation involve standard techniques of inorganic solution chemistry, particularly those of selective oxidation and precipitation. Although a relatively high degree of separation is possible by inorganic techniques, nickel and cobalt products obtained therefrom still contain undesirable contamination of the other element. Other processes developed which produce very pure cobalt and nickel exhibit low recovery. Many processes developed give excellent results but are too expensive for commercial consideration. Development of a commercial process combining the features of high recovery, high purity and economic feasibility is highly desirable.

The contamination of nickel with other metals such as zinc, lead, arsenic, iron and copper has, of course, also presented problems requiring use of complicated purification techniques, including metal organo intermediates and inorganic techniques, to remove these impurities from the nickel. Development of a process which could be used commercially to remove to a high degree all of these contaminants as well as cobalt would meet a long felt need in the purification of nickel process solutions.

Because of its great versatility, solvent extraction has offered possibilities for the solving of many metal separation problems. Many of the solvent extraction metal separation processes developed suffer, however, from excessive costs due primarily to expensive reagents required and/or excess consumption of reagent during processing. Thus, it is well known that thiocyanate ion will complex cobalt selectively over nickel and there are standard analytical methods involving the extraction of cobalt as the thiocyanate complex into various organic solvents. However, these methods depend on the addition of a great excess of thiocyanate to the aqueous phase to drive the cobalt into the organic phase with resulting heavy consumption of thiocyanate and considerable limitation in the use of the thiocyanate contaminated nickel solution. Although many attempts were made to overcome the foregoing difficulties and other difficulties, none, as far as we are aware, was entirely successful when carried into practice commercially on an industrial scale.

It has now been discovered that a number of metal impurities, including cobalt, zinc, lead, arsenic, iron and copper, may be successfully and economically substantially completely removed and recovered from nickel process solutions by a novel solvent extraction process involving the treatment of the nickel process solution with certain water-insoluble nitrogenous bases followed by scrubbing of the aqueous solution treated to recover anions from the organic extractant dissolved therein and maintain losses of these anions at a negligible level.

It is an object of the present invention to provide a process for substantially completely removing metal impurities, including cobalt, from nickel.

Another object of the invention is to provide a novel method for treating nickel process solutions for the substantially complete removal of metal impurities therefrom.

The invention also contemplates providing an economically feasible, continuous, plant scale process for removing and recovering metal impurities such as cobalt, iron and copper from nickel-containing solutions.

It is a further object of the invention to provide a novel solvent extraction process for removing impurities such as cobalt, iron, copper, zinc, lead and arsenic from nickel-containing process streams to leave a solution substantially free from these contaminating elements.

The invention further contemplates providing a novel process which allows the production of a very pure nickel with a negligible contaminant-metal content.

It is another object of the invention to provide a novel process for removing metal impurities from nickel-containing aqueous solutions by solvent extraction techniques in which organic extractant losses are negligible.

Other objects and advantages will become apparent from the following description taken in conjunction with the accompanying drawings which depicts in a block flow diagram a series of operations comprising an illustrative embodiment of the present novel solvent extraction process by which metal impurities are removed from nickel-containing solutions.

Generally speaking the present invention contemplates treating a nickel-containing solution in which metal impurities are dissolved by solvent extraction with organic solutions of nitrogenous bases from the group consisting of water-insoluble quaternary ammonium compounds and water-insoluble primary, secondary or tertiary amines to remove the metal impurities therefrom. These nitrogenous bases are all characterized by their ability to form cationic nitrogen which gives them a high affinity for the complexing of metal anions.

Any or all of the metallic contaminants cobalt, iron, copper, zinc, lead and arsenic may be removed by the hereindescribed novel process and process solutions containing chloride, sulphate or nitrate anions or mixtures thereof may be treated. Advantageously, the pH of solutions being treated should be low enough to avoid precipitation of metal hydroxides. In any case, solution pH should be such as to avoid precipitation of nickel hydroxide, i.e., below about 6.5. The extractant is dissolved in a water-immiscible solvent such as mixed xylenes, methyl isobutyl ketone, kerosene, Super Varnish Makers and Painters' Naphtha, as well as other naphthas and paraffins, substantially water-insoluble alcohols and mixtures of such alcohols with the aforementioned solvents. Solutions in a water-immiscible organic solvent of water-insoluble quaternary ammonium compounds containing anions such as chloride, thiocyanate, iodide, bromide, nitrite, azides, tungstates and molybdate are successful in varying degrees in removing metal impurities from nickel process solutions. Salts of water-insoluble primary, secondary and tertiary amines dissolved in water- immiscible organic solvents are also effective extractants. Anionic derivatives of these amines which can be utilized are the chlorides, hydrochlorides, thiocyanates, iodides, bromides and azides.

The metal bearing organic phase which forms is separated from the aqueous phase and treated with an alkali, e.g., sodium hydroxide, potassium hydroxide, ammonia and soda ash, to precipitate metal hydroxide, or with a water-soluble sulfide, e.g., sodium sulfide and/or hydrogen sulfide, to precipitate metal sulfide, and regenerate quaternary ammonium compounds. It is to be noted that thiocyanate, iodide and bromide losses to the aqueous phase in the extraction step are minimized by the presence of a water-insoluble quaternary ammonium chloride in the organic phase.

Stripping of metals from amines with alkalis proceeds readily but is less efficient than for the quaternary ammonium compounds. Thus, in order to strip metals from the amines using alkalis it is necessary to add alkali stoichiometrically equivalent to the amount of amine plus the amount of metal associated therewith whereas in stripping the quaternary ammonium compounds it is necessary to add alkali equivalent only to the metals associated therewith.

Total concentration of extractant in the organic solvent of the order of one molar is found convenient for the extraction step. Higher and lower concentrations are also effective in removing metal contaminants, with lower concentrations necessitating more stages for contaminant removal. Volume ratios of the order of 10 to 20 parts of the aqueous solution being treated to each part of organic extractant phase are also found most convenient for the extraction.

The nickel-containing aqueous stream from which contaminating metals have been removed is scrubbed to remove therefrom anions such as thiocyanate, iodide, bromide, molybdate, tungstate which have been transferred from the organic phase to the aqueous phase during extraction. This scrubbing can be accomplished with a solution of a water-insoluble amine in a water-immiscible organic solvent. Alamine 336 reagent, a tertiary amine product made by General Mills, Inc., has been found suitable for such scrubbing purposes. Alamine 336 reagent is a tri-alkyl amine with the alkyl chains containing eight to ten carbon atoms. The organic phase formed, containing anions being scrubbed from the aqueous phase, is removed from the aqueous stream and treated with an alkali, e.g., sodium hydroxide, potassium hydroxide and ammonia, to regenerate the amine solution and recover anions removed as water-soluble salts which are fed to the contaminant metal precipitation stage.

Removal of anions from the aqueous phase by this scrubbing is most conveniently accomplished by using concentrations of amine in an organic solvent of between 0.1 and 1.0 molar. Amine concentrations below and above this range are also effective in scrubbing but concentrations below 0.1 molar would necessitate an excessive number of scrubbing stages. A wide range of aqueous to organic volume phase ratios may be utilized but at above a ratio of the order of about 50:1, excessive scrubbing steps would have to be utilized.

As described hereinafter, thiocyanate, iodide and bromide ions may also be advantageously scrubbed from the aqueous solution by using a cuprous salt to precipitate cuprous thiocyanate, cuprous iodide and cuprous bromide.

Referring to the drawing which sets forth a block flow diagram of an illustrative embodiment of the herein-described novel process, involving the use of quaternary ammonium compounds as metal extractants, and which gives one a better understanding of the present invention, a nickel process solution 1 containing dissolved metal impurities is treated in metal contaminant removal operation 2 with a solution of at least one water-insoluble quaternary ammonium compound dissolved in a water-immiscible, organic solvent. As set forth hereinbefore, water-insoluble primary, secondary and tertiary amines are also useful as extractants. In operation 2 an organic solution 3 containing metal contaminants in quaternary ammonium metal-salt complexes and an aqueous nickel solution 4 from which metal contaminants have been removed and containing some thiocyanate and/or iodide, if used, dissolved therein are formed. This illustrative block flow diagram shows the presence of residual thiocyanate and iodide in nickel solution 4 merely by way of example, but as aforementioned, other anions, if associated with the organic extractant utilized, may be transferred to the aqueous phase, such as bromide, molybdate and tungstate.

The amount of thiocyanate and/or iodide dissolved in solution 4, i.e., thiocyanate and iodide losses to the aqueous solution, is minimized if a water-insoluble quaternary ammonium chloride is present in the organic phase. The metal contaminant-containing organic solution 3 is separated from aqueous solution 4 and is treated in metal precipitation operation 5 with an alkali such as sodium hydroxide to precipitate metal hydroxides quantitatively and form a dilute salt solution. At the same time operation 5 regenerates the organic compound or compounds utilized in the metal contaminant removal operation.

Although not shown on the block flow diagram, which depicts only an illustrative embodiment of the herein-described process, as stated hereinbefore, solution 3 may be treated with a water-soluble sulfide to precipitate the metal contaminants as sulfides and regenerate the organic compound or compounds. Metals forming water-soluble ammonia complexes may also be removed from the loaded extractant into aqueous solution by adding ammonia and/or ammonium carbonate.

The metal hydroxides (or sulfides) formed in operation 5 are removed in an aqueous slurry. The hydroxides (or sulfides) are filtered off and the dilute salt solution remaining goes to waste. The quaternary ammonium compounds in organic solvent 7 regenerated in operation 5 are recycled to metal contaminant removal operation 2 after the aqueous slurry of hydroxides (or sulfides) 6 has been removed.

Nickel solution 4 from metal contaminant removal operation 2 contains some quaternary ammonium compounds as well as by way of example, inorganic thiocyanate and/or iodide values dissolved therein. Quaternary ammonium values may be removed by scrubbing the solution with the water-insoluble organic solvent being utilized, e.g., xylene, as shown by operation 8 on the block flow diagram. The recovered organic solvent and reagent is then returned to the metal contaminant removal operation.

To recover inorganic thiocyanate and/or iodide values remaining, the aqueous solution from scrubbing operation 8 is treated in thiocyanate and iodide removal operation 9. As aforementioned, other anion values may be removed in this operation. This thiocyanate and iodide removal is accomplished by scrubbing the solution with a water-insoluble tertiary amine dissolved in a water-immiscible organic solvent as depicted in the drawing. Thiocyanate and iodide removal from the solution is also advantageously achieved by use of a cuprous salt as described hereinafter. The thiocyanate and iodide values are substantially completely removed from the aqueous nickel solution as complex thiocyanate and iodide salts in organic solution 10 to leave a nickel-containing aqueous solution from which metal contaminants have been removed and which can be processed for recovery of very pure nickel. Tertiary amine dissolved in this aqueous solution may be scrubbed out with the organic solvent being utilized, e.g., xylene, as shown by operation 11 on the block flow diagram, and returned to the thiocyanate and iodide removal step. Organic solution 10, which has been removed from the aqueous solution, is treated in thiocyanate and iodide recovery and amine regeneration operation 12 with an alkali such as sodium hydroxide to quantitatively separate the tertiary amine from the thiocyanate and iodide and form a solution 13 of tertiary amine in organic solvent, which is recycled to thiocyanate and iodide removal operation 9, and an aqueous solution 14 of thiocyanate and iodide and excess sodium hydroxide. Solution 14, which has been separated from organic solution 13, is fed to metal precipitation operation 5 where the sodium hydroxide serves to precipitate metals as hydroxides and regenerate organic thiocyanate and iodide. At the same time, thiocyanate and iodide dissolved in solution 14 are taken up in organic solution 7 quantitatively. The tertiary amine solution 13 is equilibrated with makeup acid before feeding to thiocyanate and iodide removal step 9 to prevent acid loss from the nickel process solution being treated.

In carrying the invention into practice, it has been found that nickel process solutions such as chloride, sulfate or nitrate or mixtures thereof, advantageously at a pH lower than the precipitation point of the hydroxide of any metal present in the solution, may be treated for removal of any or all of the metal contaminants cobalt, ferric iron, copper, zinc, lead and arsenic.

As stated hereinbefore, the metal contaminant removal operation is accomplished by treating the aqueous solution with at least one water-insoluble quaternary ammonium compound dissolved in a water-immiscible solvent. To confer insolubility in water, the quaternary ammonium compound should have at least two long alkyl chains attached to the central nitrogen atom each having carbon chains with eight atoms or more. Effective anions in the quaternary ammonium compounds are chloride, thiocyanate, iodide, bromide, nitrite, azides, tungstate and molybdate.

Two classes of quaternary ammonium compounds are found particularly advantageous for metal contaminant removal. These are Aliquat 336 reagent, hereinafter referred to as Aliquat chloride, a monomethyl quaternary ammonium chloride in which the alkyl chains each contain eight to ten carbon atoms, supplied by General Mills, Inc., and Arquad 2C reagent, hereinafter referred to as Arquad chloride, a dialkyl dimethyl ammonium chloride in which the two alkyl groups each have a carbon chain length varying from eight to eighteen and averaging about twelve, supplied by the Armour Industrial Chemical Company. The chlorides themselves and their thiocyanate, iodide, bromide, nitrite, azide, tungstate and molybdate derivatives are all effective in varying degrees in removing contaminants. However, other classes of water-insoluble quaternary ammonium chlorides and their corresponding similar anion derivatives may be utilized. Hereinafter, we shall refer to the anion derivatives of these reagents, formed by treating the chloride compounds with an aqueous solution of the desired anion, as Aliquat thiocyanate or other anion and Arquad thiocyanate or other anion, respectively.

Advantageous water-immiscible solvents for the quaternary ammonium compounds were found to be methyl isobutyl ketone, hereinafter referred to as MIBK, mixed xylenes, hereinafter referred to as xylene, and Super Varnish Makers' and Painters' Naphtha, a high quality naphtha, hereinafter referred to as SVMPN. MIBK gives the best metal contaminant extraction coefficients and the lowest anion losses but it has appreciable solubility in aqueous solution. It can, however, be removed completely by batch distillation. Xylene is almost as advantageous as MIBK insofar as metal contaminant extraction and anion losses are concerned. Also, xylene is much less soluble than MIBK in aqueous solutions and is substantially less expensive. SVMPN, which is a product of the Shell Chemical Company, is somewhat less effective than xylene but is less expensive. Substantially water-insoluble alcohols or mixtures of such alcohols with the aforementioned solvents are also useful as solvents for the quaternary ammonium compounds.

Advantageous total concentration of quaternary ammonium compounds in organic solvent is between about 0.5 M (molar) and about 1 M, that is, for a given number of moles of extractants the concentration of contaminating metals in the aqueous phase is brought to the lowest level when the concentration of extractants is between 0.5 M and about 1 M. Effective metal contaminant removal is attained, however, with total extractant concentration of between 0.1 M and 1.25 M. It is to be noted, however, that the different anions outlined hereinbefore in the quaternary ammonium compounds have varying degrees of effectiveness in removal of certain metal contaminants as shown by the test results presented hereinafter. Thus, for example, Aliquat thiocyanate is relatively inefficient in removing lead from nickel process solutions whereas Aliquat iodide is quite effective in lead removal.

No one anion in a quaternary ammonium compound solution is successful in removing all the contaminants, cobalt, iron, copper, zinc, lead and arsenic, from a nickel process solution. Thus, Aliquat thiocyanate removes cobalt, zinc, ferric iron and copper quite efficiently but is relatively ineffective for lead and arsenic removal. Aliquat chloride is effective in removing cobalt, zinc, ferric iron, lead and copper but is ineffective in arsenic removal. Aliquat iodide is efficient in removing zinc and lead. Aliquat tungstate and molybdate are both quite effective in removing arsenic but are relatively ineffective in removing other metal contaminants. It is to be noted that the effectiveness of the quaternary ammonium chlorides is dependent on chloride concentration of the solution being treated. Thus, the removal of cobalt, for example, with the chlorides is most effective at high chloride concentration.

It can be seen then that a mixture of anions in quaternary ammonium compound organic solutions may be utilized depending on the impurities which are to be removed from the nickel process solution being treated. Alternatively, one solvent extraction stream can be used for removing certain contaminants with one or more solvent extraction steps following to remove further contaminants.

The test results in Tables I to VI, following, show the effect of the use of Aliquat reagent in removing metal contaminants from nickel process solutions with various anions in the Aliquat reagent being utilized. Mixed sulfate-chloride solutions treated in these tests contained about 50 grams per liter of nickel as nickel sulfate, about 50 grams per liter of sodium chloride and about 15 grams per liter of boric acid. These tests were conducted using xylene as the solvent for the extractants. Other water-insoluble quaternary ammonium compounds and water-immiscible solvents may, of course, be utilized as explained hereinbefore.

Aliquat thiocyanate is very effective in removing cobalt contaminant. Table I illustrates the removal of cobalt from the mixed sulfate-chloride and from an all-sulfate nickel process stream containing 50 grams per liter of nickel and 15 grams per liter of boric acid. The solutions treated in each test contained varying concentrations of cobalt. Tests 1 to 6 were conducted on the mixed sulfate-chloride solution containing chloride ions as 50 grams per liter of sodium chloride and Tests 7 and 8 were conducted on the chloride-free sulfate solution. A comparison of Tests 1 and 2 with Tests 7 and 8 indicates that cobalt removal proceeds more favorably in an aqueous stream containing chloride ions but that cobalt may still be removed from an all sulfate solution. Comparison of Tests 1 and 2 with Tests 4 to 6, inclusive, illustrates the depressing effect of Aliquat chloride and iodide on cobalt removal at this particular chloride concentration. As disclosed hereinbefore, as chloride concentration increases, removal of cobalt by Aliquat chloride becomes more effective.

These tests indicate the progressive lowering of cobalt concentration by a series of extractions (compare Tests 1 and 2) and, in fact, cobalt impurity concentration can be lowered to any desired level by use of suitable volume ratios of aqueous to organic phase and a number of stages, using countercurrent flow between organic and aqueous phases. Thus, in treating the mixed sulfate-chloride nickel-process solution containing 50 grams of nickel per liter and 0.1 gram of cobalt per liter for cobalt removal according to the hereindescribed novel process, it is possible to reduce the cobalt concentration to a level of 0.002 gram per liter or less in four stages using 0.5 M Aliquat thiocyanate in xylene with an aqueous to organic volume phase ratio of 35:1, in five stages using 0.5 M Aliquat thiocyanate in SVMPN with an aqueous to organic volume phase ratio of 30:1 and in six stages using 0.5 M Arquad thiocyanate in MIBK with an aqueous to organic volume phase ratio of 25:1.

Table I

| Test No. | Extractant (in xylene) | Volume ratio of aqueous to organic | Cobalt concentration of solutions (g./l.) | | |
|---|---|---|---|---|---|
| | | | Initial aqueous | Equilibrium solutions | |
| | | | | Aqueous | Organic |
| 1 | 0.5 M AlSCN | 40:1 | 0.205 | 0.100 | 4.20 |
| 2 | 0.5 M AlSCN | 40:1 | 0.102 | 0.032 | 2.80 |
| 3 | 0.8 M AlCl | 20:1 | 0.20 | 0.142 | 1.16 |
| 4 | {0.8 M AlCl, 0.5 M AlSCN} | 20:1 | 0.10 | 0.067 | 0.66 |
| 5 | {0.5 M AlSCN, 0.15 M AlCl, 0.25 M AlI} | 25:1 | 0.236 | 0.086 | 3.75 |
| 6 | {0.5 M AlSCN, 0.15 M AlCl, 0.25 M AlI} | 25:1 | 0.059 | 0.014 | 1.13 |
| 7 | 0.5 M AlSCN | 40:1 | 0.24 | 0.18 | 2.32 |
| 8 | 0.5 M AlSCN | 40:1 | 0.12 | 0.10 | 0.68 |

NOTE.—g./l.=grams per liter. AlSCN=Aliquat thiocyanate. AlCl=Aliquat chloride. AlI=Aliquat iodide.

Table II illustrates the removal of zinc from nickel process streams containing various concentrations of zinc in solution. Tests 1 to 6, inclusive, were conducted on the mixed sulfate-chloride solution. Tests 7 and 8 were carried out on a sulfate solution containing no chloride ions with a nickel concentration of 50 grams per liter. Tests 9 and 10 were performed on a nickel nitrate solution also containing 50 grams per liter of nickel. As can be seen by these tests, removal of zinc contaminant from nickel process solutions proceeds very readily using solutions of Aliquat compounds containing any or all of chloride, thiocyanate or iodide anions. These tests also show that zinc removal proceeds rapidly from chloride, sulfate or nitrate process solutions. By multiple extraction stages, zinc contamination can be reduced to a very low amount. Thus, zinc concentration can be reduced from 0.025 gram per liter in a mixed sulfate-chloride nickel process solution down to less than $10^{-5}$ gram per liter using two extraction stages, 0.5 M Aliquat thiocyanate in xylene and an aqueous to organic volume phase ratio of 40:1.

Table II

| Test No. | Extractant (in xylene) | Volume ratio of aqueous to organic | Zinc concentration of solutions (g./l.) | | |
|---|---|---|---|---|---|
| | | | Initial aqueous | Equilibrium solutions | |
| | | | | Aqueous | Organic |
| 1 | 0.5 M AlCl | 10:1 | 0.1 | 0.0008 | 1.0 |
| 2 | 0.5 M AlCl | 5:1 | 0.1 | 0.0005 | 0.5 |
| 3 | 0.5 M AlI | 10:1 | 0.1 | 0.004 | 0.96 |
| 4 | 0.5 M AlI | 5:1 | 0.1 | 0.003 | 0.49 |
| 5 | 0.5 M AlSCN | 10:1 | 0.2 | 0.0006 | 2.0 |
| 6 | 0.5 M AlSCN | 5:1 | 0.2 | 0.0002 | 1.0 |
| 7 | 0.5 M AlSCN | 10:1 | 0.1 | 0.0017 | 0.98 |
| 8 | 0.5 M AlSCN | 5:1 | 0.1 | 0.0003 | 0.50 |
| 9 | 0.5 M AlSCN | 10:1 | 0.1 | 0.001 | 1.0 |
| 10 | 0.5 M AlSCN | 5:1 | 0.1 | 0.0002 | 0.50 |

The removal of lead from nickel process streams is illustrated by the test results in Table III. These tests were all conducted on the mixed sulfate-chloride solution containing varying amounts of lead. Aliquat extractants in xylene was used in these tests containing iodide, chloride or thiocyanate anions or a mixture of each of these anions and using an aqueous to organic volume ratio of 25:1 in each case. The tests indicate that Aliquat iodide is a very efficient lead extractant (see Tests 1 and 2). Aliquat chloride is less effective in removing lead as shown by Tests 6 and 7 and Aliquat thiocyanate is even less effective than the chloride as shown by Tests 8 and 9. Tests 3, 4 and 5, in comparison with Tests 1 and 2, show the depressing effect on lead removal with Aliquat iodide by the presence of chloride and/or thiocyanate anion. Lead removal in these tests is still very efficient however. As in the removal of other metal contaminants, lead in a nickel process stream can be lowered to insignificant amounts by a series of extraction stages as illustrated by comparing Tests 1 and 2 in Table III.

Table III

| Test No. | Extractant (in xylene) | Lead concentration of solutions (g./l.) | | |
|---|---|---|---|---|
| | | Initial aqueous | Equilibrium solutions | |
| | | | Aqueous | Organic |
| 1 | 0.25 M AlI | 0.03 | 0.0025 | 0.69 |
| 2 | 0.25 M AlI | 0.01 | 0.0009 | 0.23 |
| 3 | {0.25 M AlI, 0.4 M AlCl} | 0.01 | 0.0021 | 0.20 |
| 4 | {0.25 M AlI, 0.5 M AlSCN} | 0.01 | 0.0028 | 0.18 |
| 5 | {0.25 M AlI, 0.15 M AlCl, 0.5 M AlCNS} | 0.01 | 0.0025 | 0.19 |
| 6 | 0.5 M AlCl | 0.03 | 0.021 | 0.23 |
| 7 | 0.5 M AlCl | 0.01 | 0.007 | 0.074 |
| 8 | 0.5 M AlCNS | 0.03 | 0.024 | 0.14 |
| 9 | 0.5 M AlCNS | 0.01 | 0.008 | 0.05 |

Ferric iron removal proceeds effectively with quaternary ammonium compounds containing either or both thiocyanate and chloride anions. Extraction from chloride-containing nickel solutions is more effective than from sulfate solutions. Table IV shows the extraction of iron from nickel process solutions using Aliquat chloride or Aliquat thiocyanate extractants in xylene and mixtures of the two. Tests 1 to 6, inclusive, were conducted on the mixed sulfate-chloride solution containing varying amounts of ferric iron. Tests 7 and 8 were conducted on an all-sulfate solution containing 50 grams per liter of nickel. Comparison of Tests 1 and 2 with 3 and 4 shows the superiority of thiocyanate anion in the extractant over chloride anion. Comparison of Tests 5 and 6 with 1 and 2 shows, as could be expected, more extensive ferric iron removal with lower aqueous to organic volume phase ratios. Tests 7 and 8 show the removal of ferric iron from all-sulfate solutions even though less effectively than from a chloride-containing process solution.

By a series of extraction stages, ferric iron contamination in a nickel process stream may be reduced by any desired degree as is illustrated by comparing the results of Tests 1 and 2 in Table IV. Thus, iron concentration in a sulfate-chloride nickel process stream may be lowered from 0.05 gram per liter to at least 0.001 gram per liter in five stages using a 0.5 M Aliquat thiocyanate extractant and an aqueous to organic volume phase ratio of 40:1.

Table IV

| Test No. | Extractant (in xylene) | Volume ratio of aqueous to organic | Iron concentration of solutions (g./l.) | | |
|---|---|---|---|---|---|
| | | | Initial aqueous | Equilibrium solutions | |
| | | | | Aqueous | Organic |
| 1 | 0.5 M AlSCN | 40:1 | 0.20 | 0.12 | 3.0 |
| 2 | 0.5 M AlSCN | 40:1 | 0.10 | 0.046 | 2.2 |
| 3 | 0.5 M AlCl | 10:1 | 0.2 | 0.16 | 0.40 |
| 4 | 0.5 M AlCl | 5:1 | 0.2 | 0.14 | 0.30 |
| 5 | {0.5 M AlSCN, 0.2 M AlCl} | 10:1 | 0.2 | 0.05 | 1.5 |
| 6 | {0.5 M AlSCN, 0.2 M AlCl} | 5:1 | 0.2 | 0.014 | 0.93 |
| 7 | 0.5 M AlSCN | 40:1 | 0.18 | 0.16 | 0.80 |
| 8 | 0.5 M AlSCN | 40:1 | 0.09 | 0.07 | 0.76 |

The results of tests showing the removal of copper in the cupric state from nickel process solutions are outlined in Table V. In these tests 0.5 M Aliquat thiocyanate in xylene was used as the extractant with an aqueous to organic volume phase ratio of 40:1 in each test. Tests 1, 2 and 3 were conducted on the mixed sulfate-chloride nickel solution. Tests 4 and 5 were carried out on an all-sulfate solution containing 50 grams per liter of nickel and no chloride ion. Copper concentration in each test varied. From these tests it is seen that cupric copper is readily extracted with Aliquat thiocyanate with extraction from chloride-containing solutions being more effective than from sulfate solutions free of chloride ion. Cupric copper removal with Aliquat chloride also proceeds effectively. It is found that removal of cuprous copper proceeds even more readily than that of cupric copper.

Copper contamination can be lowered to any desirable level by multiple stage extraction. It is possible to reduce cupric copper concentration from 0.1 gram per liter down to at least 0.001 gram per liter in four stages when treating a sulfate-chloride nickel process solution using 0.5 M Aliquat thiocyanate in xylene as the extractant and an aqueous to organic volume phase ratio of 40:1. Cuprous copper contamination is eliminated even more readily, being reduced from 0.1 gram per liter down to a virtually undetectable level in only two stages.

Table V

| Test No. | Copper concentration of solutions (g./l.) | | |
|---|---|---|---|
| | Initial aqueous | Equilibrium solutions | |
| | | Aqueous | Organic |
| 1 | 0.20 | 0.068 | 5.4 |
| 2 | 0.15 | 0.054 | 3.9 |
| 3 | 0.10 | 0.037 | 2.6 |
| 4 | 0.15 | 0.112 | 1.5 |
| 5 | 0.05 | 0.036 | 0.6 |

Extraction of arsenic impurities from nickel solutions is negligible with Aliquat chloride and thiocyanate but proceeds quite effectively with Aliquat molybdate and tungstate. Even though the tungstate and molybdate successfully removed arsenic as arsenite from aqueous solutions, in none of the tests conducted was it found that the concentration of arsenic in the aqueous phase could be reduced below about 0.2 p.p.m. (parts per million). It would appear that arsenic removal should advantageously take place in a separate stage. Table VI shows the results of tests conducted on arsenic removal. Tests 1 and 2 illustrate the negligible effect of Aliquat chloride in xylene even at very low aqueous to organic volume phase ratios. Tests 3 to 6 illustrate the effectiveness of Aliquat tungstate and molybdate in xylene in removing arsenic. There appears to be little difference in their effectiveness from the results of these tests although the tungstate seems to be somewhat more efficient at the lower concentration of arsenic in the aqueous phase shown in the table. In each of these tests the sulfate-chloride nickel process solution was treated. In this table AlW denotes Aliquat tungstate and AlM denotes Aliquat molybdate.

Table VI

| Test No. | Extractant (in xylene) | Volume ratio of aqueous to organic | Arsenic concentration of solutions (g./l.) | | |
|---|---|---|---|---|---|
| | | | Initial aqueous | Equilibrium solutions | |
| | | | | Aqueous | Organic |
| 1 | 0.5 M AlCl | 5:1 | 0.01 | 0.0089 | 0.0055 |
| 2 | 0.5 M AlCl | 2:1 | 0.01 | 0.0076 | 0.0048 |
| 3 | 1.0 M AlW | 25:1 | 0.03 | 0.0093 | 0.52 |
| 4 | 1.0 M AlW | 25:1 | 0.01 | 0.0027 | 0.18 |
| 5 | 1.0 M AlM | 25:1 | 0.03 | 0.010 | 0.49 |
| 6 | 1.0 M AlM | 25:1 | 0.01 | 0.0035 | 0.16 |

An important factor to be considered in the process is the minimizing of anion loss to the aqueous solution. Table VII shows a comparison of thiocyanate concentration in aqueous phase with organic phase consisting of Aliquat chloride in a variety of solvents and Arquad chloride (ArCl) in MIBK at equilibrium between the phases. The initial aqueous solution used in each of the tests of Table VII contained 50 grams per liter of nickel, 0.01 milliequivalent per liter (meq./ml.) of thiocyanate ion and no metal contaminant. An aqueous to organic phase ratio of 40:1 was used in each test. The Aliquat system is seen to be superior to the Arquad system as far as thiocyanate loss to aqueous solution is concerned. The figures in Table VII indicate, however, that the amount of thiocyanate loss does not vary markedly with the solvent.

Table VII

| Extractant | Thiocyanate in final aqueous solution | |
|---|---|---|
| | Concentration (meq./ml.) | Percent |
| 0.5 M AlCl in xylene | 0.0027 | 27 |
| 0.5 M AlCl 10% TBP in 90% SVMPN | 0.0029 | 29 |
| 0.5 M AlCl in MIBK | 0.0023 | 23 |
| 0.5 M ArCl in MIBK | 0.0042 | 42 |

Note.—TBP denotes tributyl phosphate.

Iodide dissolution in the final aqueous solution is found to be less severe also with the Aliquat system compared with the Arquad system with different solvents again causing very little variation in iodide loss.

As aforementioned, thiocyanate, iodide, bromide, molybdate and tungstate losses to the aqueous phase are appreciably reduced with the presence in the organic phase of a water-insoluble quaternary ammonium chloride along with the corresponding thiocyanate, iodide, bromide, molybdate and tungstate. Thus, Aliquat chloride or Arquad chloride may be used with Aliquat thiocyanate and/or iodide or Arquad thiocyanate and/or iodide, respectively, to reduce the amount of thiocyanate and/or iodide dissolved in aqueous solution after metal extraction. Table VIII shows a number of tests conducted on an aqueous solution containing 50 grams per liter of nickel from which substantially all metal contaminants have been removed using various concentrations of Aliquat thiocyanate extractant in xylene with and without Aliquat chloride in the extractant. As can be seen from Table VIII, the presence of 0.2 M Aliquat chloride in 0.5 M Aliquat thiocyanate in xylene cuts the thiocyanate loss from 32% to 21%. In using SVMPN as an organic solvent it is found that thiocyanate loss is reduced from 35% to 25%. The presence of higher concentrations of Aliquat chloride is not found to be warranted, since, as shown by the tests in Table VIII, thiocyanate loss is not further reduced. Thus, thiocyanate loss can never be reduced by increased chloride addition to the point where a subsequent scrub stage could be eliminated. Another factor affecting increase in Aliquat chloride addition is that the organic solutions become noticeably viscous when the total concentration of Aliquat reagents approaches 1M. The presence of Arquad chloride, if using Arquad thiocyanate for metal contaminant removal, has a similar effect in reducing thiocyanate loss to the aqueous phase.

Table VIII is illustrative of the effect of the presence of Aliquat chloride in lowering thiocyanate loss to the aqueous phase. A similar effect is found so far as iodide, bromide, molybdate and tungstate loss to the aqueous phase is concerned with their loss also being reduced by about one third. As outlined in considerable detail hereinbefore, Aliquat chloride itself is useful in extracting certain contaminating elements and so its effect is, in fact, two-fold, i.e., contaminant removal and lowering of anion, e.g., thiocyanate and iodide, loss to the aqueous phase.

*Table VIII*

| Extractant | Volume of initial solutions | | SCN in final aqueous solution | |
|---|---|---|---|---|
| | Aqueous (ml.) | Organic (ml.) | Concentration (meq./ml.) | Percent |
| 1 M AlSCN | 120 | 1.5 | 0.0044 | 35.5 |
| 0.5 M AlSCN | 120 | 3.0 | 0.0040 | 32.0 |
| 0.5 M AlSCN, 0.4 M AlCl | 120 | 3.0 | 0.0026 | 21.0 |
| 0.5 M AlSCN, 0.2 M AlCl | 120 | 3.0 | 0.0026 | 21.0 |
| 0.25 M AlSCN, 0.2 M AlCl | 120 | 6.0 | 0.0029 | 23.0 |

Scrubbing of thiocyanate, iodide or other anions from the metal contaminant-free aqueous stream can, as aforementioned, be accomplished by using a water-insoluble amine dissolved in a water-insoluble organic solvent. Alamine 336 reagent was found suitable for this scrubbing step. Alamine 336 reagent is soluble in both polar and nonpolar solvents. Any reference hereinafter to the use of Alamine in the scrubbing step will mean the use of this Alamine 336 reagent. The hydrochloride salt of this reagent, Alamine hydrochloride, was utilized in tests on the scrubbing of thiocyanate and iodide from the aqueous streams, the results of which are shown in tables following.

The thiocyanate and/or iodide are removed and separated from the aqueous stream in the organic amine phase. The organic phase can then be treated with an alkali, e.g., sodium hydroxide, potassium hydroxide and ammonia, to regenerate aqueous solution containing the thiocyanate and/or iodide values and an organic phase containing the amine reagent. Since the amine is put in its free state upon regeneration with an alkali and would take up acid upon being added to further solution being treated, in order to prevent acid loss from the nickel process stream the regenerated amine stream may be equilibrated with acid to form a salt of the amine. Alternatively, acid may be added directly to the aqueous process stream being scrubbed with amine.

Any water-insoluble amine may be utilized for thiocyanate and iodide scrubbing which will complex the thiocyanate or iodide ions. Thus, Amberlite LA-1 reagent, a secondary amine product made by Rohm and Haas, which is a mixture with a molecular weight in the range 350 to 390, corresponding to an approximate formula of $(C_{12}H_{26})_2NH$, is also found to be useful for scrubbing thiocyanate and iodide.

A means of measuring the efficiency of thiocyanate complexing by a particular amine consists of mixing the aqueous solution which has been treated with amine with Aliquat chloride reagent dissolved in xylene. About 80% of any thiocyanate left in the aqueous solution is extracted into the organic phase in one stage by the Aliquat chloride using about 40 volumes of aqueous solution to 1 volume of 0.5 M Aliquat chloride in xylene. The thiocyanate is then stripped from the organic phase into an aqueous phase by equilibrating the organic phase with an aqueous solution of sodium perchlorate. Using 1 volume of organic phase with 2 volumes of 1 M sodium perchlorate results in about 95% stripping of the thiocyanate. The thiocyanate in the aqueous perchlorate solution can then be analyzed by standard colorimetric methods based on formation of the blood-red ferric thiocyanate complex. The above-mentioned extraction and stripping factors can be used in correcting the analytical results. It is found that any amine which efficiently complexes the thiocyanate ion is also effective in complexing the iodide ion so that this test is useful in choosing an extractant which removes iodide from the aqueous phase also.

Scrubbing of bromide, tungstate or molybdate from the aqueous stream also is accomplished by use of a water-insoluble amine in an organic solvent using the same procedure as that described in conjunction with thiocyanate and iodide removal.

Another advantageous means for removing thiocyanate and iodide from the aqueous process stream is to precipitate the thiocyanate or iodide as cuprous thiocyanate or iodide by adding a cuprous salt to the thiocyanate and/or iodide contaminated solution. After filtration, the cuprous thiocyanate and/or iodide is treated with an alkali such as sodium hydroxide to regenerate the aqueous solution of thiocyanate and/or iodide which is recycled to the metal-contaminant removal step. Cuprous hydroxide precipitated is then treated with acid for regeneration of the cuprous salt and reuse in further thiocyanate and iodide removal. Alternatively, the cuprous hydroxide may be added to the process stream being scrubbed along with make-up acid to prevent acid loss from the aqueous stream. A similar procedure can be used for bromide removal utilizing a cuprous salt.

A water-insoluble organic solvent such as xylene, SVMPN, other naphthas and paraffins, kerosene, substantially water-insoluble alcohols and mixtures of such alcohols with the foregoing solvents, may be used for the scrubbing reagent. Table IX shows data for the removal of thiocyanate from aqueous solution containing 50 grams per liter of nickel and substantially barren of metal contaminants using 0.5 M Alamine hydrochloride in xylene and in SVMPN. An aqueous to organic volume phase ratio of 40:1 was used in each of these tests. As shown by this data the thiocyanate concentration in the aqueous phase can be taken down to any desired level by proper choice of phase ratio and number of stages. With an aqueous to organic ratio of 50:1 and using five scrubbing stages with 0.5 M Alamine hydrochloride in xylene it is found that thiocyanate concentration can be dropped to 1.5 parts per million. If this is an unacceptable thiocyanate concentration in the aqueous stream being treated, additional scrubbing stages can be used.

*Table IX*

| Solvent | Thiocyanate concentration of solutions (g./l.) | | |
|---|---|---|---|
| | Initial aqueous | Equilibrium solutions | |
| | | Aqueous | Organic |
| Xylene | 0.010 | 0.0043 | 0.227 |
| Do | 0.005 | 0.0016 | 0.137 |
| Do | 0.0025 | 0.0007 | 0.074 |
| Do | 0.001 | 0.0002 | 0.031 |
| SVMPN | 0.010 | 0.0045 | 0.220 |
| SVMPN | 0.005 | 0.0016 | 0.137 |
| SVMPN | 0.0025 | 0.0006 | 0.076 |
| SVMPN | 0.001 | 0.0002 | 0.032 |

Table X shows data for removal of iodide from an aqueous solution containing 50 grams per liter of nickel using 0.5 M Alamine hydrochloride in xylene. In each test an aqueous to organic volume phase ratio of 20:1 was utilized. In the first five tests there was no thiocyanate present in the aqueous phase. In the last four tests the aqueous phase contained 500 p.p.m. of thiocyanate in addition to the iodide. Comparing the results of the last four tests with the first five, shows that iodide extraction is reduced by the presence of thiocyanate because of the use of part of the Alamine reagent in taking up thiocyanate. The progressive extraction shown in the first five tests and again in the last four tests indicates that iodide concentration in the aqueous phase can also be taken down to any desired level by proper choice of phase ratio and number of stages.

*Table X*

| Thiocyanate present | Iodide concentration of solutions (g./l.) | | |
|---|---|---|---|
| | Initial aqueous | Equilibrium solutions | |
| | | Aqueous | Organic |
| No | 0.05 | 0.0049 | 0.90 |
| No | 0.01 | 0.00096 | 0.18 |
| No | 0.002 | 0.00030 | 0.034 |
| No | 0.001 | 0.00013 | 0.017 |
| No | 0.0005 | 0.00005 | 0.009 |
| Yes | 0.05 | 0.0090 | 0.82 |
| Yes | 0.01 | 0.0016 | 0.17 |
| Yes | 0.002 | 0.00044 | 0.031 |
| Yes | 0.001 | 0.00033 | 0.013 |

The Alamine reagent and thiocyanate or iodide is easily separated for recycle by treatment with a base such as sodium hydroxide or potassium hydroxide. The reaction to form the original amine reagent in the organic solvent and thiocyanate or iodide in the aqueous phase goes to completion when the thiocyanate- or iodide-bearing organic phase is equilibrated with 1 M sodium hydroxide. The thiocyanate or iodide is returned to the metal contaminant removal stream and the tertiary amine is returned to the thiocyanate removal stream. This procedure is also followed for other anions scrubbed from the nickel process stream. Hydrochloric, sulfuric, or nitric acids may be added to the amine stream to form the corresponding amine salt if it is desired to prevent acid loss from the aqueous process solution being treated, since the amine itself will react with and remove acid from the aqueous stream if make-up acid is not provided. Alternately acid may be added directly to the process stream.

As aforestated, metal contaminants are removed from the loaded quaternary ammonium compound organic phase by treatment with a base such as sodium hydroxide, potassium hydroxide or sodium carbonate. It has been found that treatment with an amount of 1 M sodium hydroxide stoichiometrically equivalent to the metal present results in quantitative precipitation of metal hydroxide. Ammonia is found to give very clean precipitates but requires use of at least 100% excess of the reagent. Removal of metals forming water-soluble ammonia complexes, such as copper and cobalt from the loaded extractant into aqueous solution can be accomplished using ammonia and/or ammonium carbonate. Chelating agents and in particular Versene and its derivatives, are also useful stripping agents for removing metals from the extractant.

Metal contaminants may also be removed from the organic extractant phase, as stated hereinbefore, by treatment with a soluble sulfide to precipitate the metals as sulfides and regenerate the extractant phase for re-use.

An advantageous feature of metal contaminant precipitation with base is that it works to advantage in conjunction with the treatment with base used to separate the tertiary amine or other amine reagent and anions removed from the aqueous solution, e.g., thiocyanate and iodide. Thus, excess base is used to treat the thiocyanate and/or iodide loaded amine stream and the aqueous phase from this treatment is used to treat the metal-loaded quaternary ammonium compound stream. The excess base from the amine treatment is, therefore, used to precipitate metal which has been removed from the nickel process stream. Furthermore, the thiocyanate and/or iodide losses are returned to the quaternary ammonium compound stream in the same contact and transfer of thiocyanate and/or iodide from the aqueous phase to the organic phase in this system is quantitative.

As stated hereinbefore, water-insoluble primary, secondary and tertiary amines are other nitrogenous bases which are effective in removing metal contaminants from nickel process solutions. The amines are used dissolved in water-immiscible organic solvents as are the quaternary ammonium compounds. The chloride, hydrochloride, hydrothiocyanate, thiocyanate, iodide and bromide anion derivatives of these amines are all useful as extractants. The tertiary amines are found to be very good extractants, the secondary amines not quite as effective and the primary amines least effective of the three groups. A comparison of the effectiveness of the tertiary, secondary and primary amines can be seen in the tests following.

An effective tertiary amine extractant has been found to be Alamine 336 reagent mentioned hereinbefore as being useful in scrubbing thiocyanate and iodide from treated aqueous solutions. Thus, this Alamine reagent can have a double function in the hereindescribed process. Table XI illustrates the removal of cupric and cuprous copper, cobalt, zinc and ferric iron from a nickel process solution containing 50 grams per liter of nickel as nickel sulfate, 50 grams per liter of sodium chloride and 15 grams per liter of boric acid. In these tests the nickel process solution had varying contents of different metal contaminants. In Tests 1 to 4 and 8 to 11 the solution was treated with 1.0 N Alamine hydrochloride in kerosene and in Tests 5 to 7 the solution was treated with 0.65 N Alamine hydrochloride and 0.35 N Alamine hydrothiocyanate in kerosene. In all tests an aqueous to organic volume phase ratio of 5:1 was used. As can be seen by the results of these tests in Table XI, this tertiary amine is an efficient extractant for removing metal impurities, including cupric and cuprous copper, cobalt, zinc and ferric iron from nickel process solutions.

*Table XI*

| Test No. | Contaminant metal | Concentration of metal contaminant in solutions (g./l.) | | |
|---|---|---|---|---|
| | | Initial aqueous | Equilibrium solutions | |
| | | | Aqueous | Organic |
| 1 | Cupric copper | 1.0 | 0.57 | 2.15 |
| 2 | do | 0.60 | 0.42 | 0.90 |
| 3 | do | 0.40 | 0.24 | 0.80 |
| 4 | Cuprous copper | 0.20 | Trace | 1.0 |
| 5 | Cobalt | 0.50 | 0.25 | 1.25 |
| 6 | do | 0.20 | 0.095 | 0.52 |
| 7 | do | 0.10 | 0.045 | 0.28 |
| 8 | Zinc | 1.0 | 0.69 | 1.54 |
| 9 | do | 0.6 | 0.33 | 1.36 |
| 10 | do | 0.2 | 0.10 | 0.50 |
| 11 | Ferric iron | 0.20 | 0.001 | 0.995 |

Table XII contains test results which show the removal of cupric and cuprous copper, cobalt and zinc from a nickel process solution with the same make-up as that treated to obtain the test results shown in Table XI using Amberlite LA-1 reagent, a secondary amine product referred to hereinbefore. In these tests, the nickel process solution was treated for removal of varying amounts of different metal contaminants. In Tests 1 to 6 and 10 to 12, 1.0 N Amberlite LA-1 hydrochloride in kerosene was utilized as the extractant and in Tests 7 to 9, 0.5 N Amberlite LA-1 hydrochloride and 0.5 N Amberlite LA-1 hydrothiocyanate in kerosene was used. An aqueous to organic volume phase ratio of 5:1 was used in all tests. The tests show that this secondary amine is a relatively good extractant for cupric and cuprous copper, cobalt and zinc. It is to be noted, however, that this amine provides negligible extraction of ferric iron.

Table XII

| Test No. | Contaminant metal | Concentration of metal contaminants in solutions (g./l.) | | |
|---|---|---|---|---|
| | | Initial aqueous | Equilibrium solutions | |
| | | | Aqueous | Organic |
| 1 | Cupric copper | 1.0 | 0.58 | 2.12 |
| 2 | ----do---- | 0.6 | 0.39 | 1.05 |
| 3 | ----do---- | 0.2 | 0.040 | 0.80 |
| 4 | Cuprous copper | 0.20 | 0.17 | 0.16 |
| 5 | ----do---- | 0.08 | 0.044 | 0.18 |
| 6 | ----do---- | 0.03 | 0.005 | 0.12 |
| 7 | Cobalt | 0.50 | 0.17 | 1.65 |
| 8 | ----do---- | 0.20 | 0.061 | 0.70 |
| 9 | ----do---- | 0.05 | 0.010 | 0.20 |
| 10 | Zinc | 1.0 | 0.24 | 3.81 |
| 11 | ----do---- | 0.20 | 0.038 | 0.40 |
| 12 | ----do---- | 0.04 | 0.011 | 0.14 |

Table XIII contains test results which show the removal of cupric and cuprous copper and zinc from a nickel process solution of the same make-up as that in the tests of Tables XI and XII using Primene JMT reagent, a primary amine mixture mainly in the $C_{18}$ to $C_{22}$ range and manufactured by Rohm and Haas. In these tests cupric and cuprous copper as well as zinc, present in varying amounts in the nickel solution was extracted. In all tests 1.0 N Primene JMT hydrochloride in kerosene was utilized as the extractant at an aqueous to organic volume phase ratio of 5:1. These tests indicate that this primary amine is a fairly good extractant for cupric copper and zinc but that it extracts cuprous copper more slowly than the secondary amine used in the tests of Table XII. It is to be noted that cobalt and ferric iron extraction with this amine is negligible.

Table XIII

| Test No. | Contaminant metal | Concentration of metal contaminants in solutions (g./l.) | | |
|---|---|---|---|---|
| | | Initial aqueous | Equilibrium solutions | |
| | | | Aqueous | Organic |
| 1 | Cupric copper | 1.0 | 0.56 | 2.18 |
| 2 | ----do---- | 0.6 | 0.24 | 1.78 |
| 3 | ----do---- | 0.2 | 0.06 | 0.70 |
| 4 | Cuprous copper | 0.16 | 0.13 | 0.14 |
| 5 | ----do---- | 0.05 | 0.026 | 0.12 |
| 6 | ----do---- | 0.03 | 0.009 | 0.10 |
| 7 | Zinc | 1.0 | 0.78 | 1.10 |
| 8 | ----do---- | 0.2 | 0.13 | 0.37 |
| 9 | ----do---- | 0.1 | 0.068 | 0.16 |

As aforementioned, stripping of the metal-loaded tertiary, secondary and primary amines is accomplished by using an alkali such as sodium hydroxide, potassium hydroxide, ammonia and soda ash. At the same time that the metals are stripped from the amine, the amine is regenerated for further use in metal contaminant removal. As set forth hereinbefore, the alkali converts the amine to its free state and the amine should be equilibrated with acid before re-use so that it will not remove acid from the process stream being treated.

For the purpose of giving those skilled in the art a better understanding of the present invention, an example of the novel combination of operations directed to the removal of cobalt from a nickel process stream and illustrated by the flowsheet in the accompanying drawing is given hereinafter:

A nickel process solution 1 containing 50 grams per liter of nickel, 0.1 gram per liter of cobalt, 50 grams per liter of sodium chloride and 15 grams per liter of boric acid was subjected to cobalt removal operation 2 consisting of four countercurrent extraction stages using 0.5 M Aliquat thiocyanate and 0.2 M Aliquat chloride in xylene and an aqueous/organic phase ratio of 35:1. A cobalt-containing organic solution 3 and a substantially cobalt-free aqueous nickel solution 4 containing some thiocyanate dissolved therein were the separate products obtained from the cobalt removal operation 2. Solution 3 was treated in cobalt precipitation and thiocyanate regeneration step 5 with 1 M sodium hydroxide to precipitate all the cobalt from the organic reagent as cobalt hydroxide and regenerate the Aliquat thiocyanate. The sodium hydroxide used came mainly from the regeneration of amine step described hereinafter with some sodium hydroxide being added to insure complete cobalt precipitation. The aqueous slurry of cobalt hydroxide 6 from operation 5 was filtered to recover cobalt hydroxide with dilute sodium chloride solution obtained therefrom going to waste. Regenerated Aliquat thiocyanate 7 from operation 5 was recycled to cobalt removal operation 2.

The substantially cobalt-free solution 4 with a cobalt content of 0.0016 gram per liter was subjected to scrubbing step 8, using xylene to remove Aliquat thiocyanate dissolved therein and the Aliquat reagent with xylene returned to the cobalt removal cycle. Solution 4 was then subjected to thiocyanate removal operation 9 consisting of five countercurrent scrubbing stages using 0.5 M Alamine hydrochloride in xylene and an aqueous/organic phase ratio of 50:1. The nickel process solution left the final scrubbing stage with a thiocyanate content of 1.5 parts per million. This solution was subjected to scrubbing step 11 using xylene to remove Alamine reagent dissolved therein and the Alamine reagent and xylene were returned to the thiocyanate removal operation. The thiocyanate-containing organic solution 10 obtained from thiocyanate removal step 9 was subjected to thiocyanate recovery and regeneration of amine operation 12 in which it was treated with excess 1 M sodium hydroxide to separate the thiocyanate and Alamine reagent with the thiocyanate going into aqueous solution. The regenerated Alamine reagent in xylene 13, after being equilibrated with hydrochloric acid so it would not remove acid from the nickel process solution, was recycled to thiocyanate removal operation 9. The aqueous solution of thiocyanate 14, containing excess sodium hydroxide coming from recovery operation 12, was used in the cobalt precipitation step 5 while at the same time returning recovered thiocyanate to the Aliquat thiocyanate cycle.

In treating nickel process solutions containing a number of metal impurities, such as cobalt, iron, copper, lead, zinc and arsenic, it has been found that impurities may be removed simultaneously or by successive extraction stages with different extractants. Metal extraction is accomplished with solutions in organic solvents of the aforedescribed nitrogenous bases consisting of long chain alkyl quarternary ammonium compounds containing chloride, thiocyanate, iodide, bromide, nitrite, tungstate and molybdate anions and tertiary, secondary and primary amine salts containing chloride, thiocyanate, iodide and bromide anions. Multi-stage counter-current extraction has been found to remove these impurities down to acceptable levels. Aqueous to organic volume phase ratios for metal contaminant removal of between about 20:1 and about 50:1 have been found advantageous with ratios in the lower part of this range being utilized for removal of higher amounts of metal contaminants and ratios of even below this range being used for removal of large amounts of metal contaminants from nickel-containing solutions. Thus, aqueous to organic volume phase ratios of down to 5:1 or lower may be utilized to prevent an excessive number of extraction steps in removing large amounts of metal impurities. Any losses of thiocyanate, iodide, bromide, nitrite, molybdate or tungstate to the process stream are recovered by treatment with an organic solution of a water-insoluble amine, or, in the case of thiocyanate, iodide or bromide recovery, by addition of a cuprous salt which will precipitate insoluble cuprous thiocyanate, iodide or bromide. The metal values are stripped from the loaded extractant by precipitation with an alkali such as caustic soda or with a soluble sulfide such as sodium or hydrogen sulfide or by a water-stripping procedure, particularly with the amine extractants. The depleted extractant is then ready for recycle in the process back to the treatment of further metal-contaminated nickel process solution.

The following examples illustrate the simultaneous removal of a number of metal impurities from a nickel process solution by the hereindescribed novel process:

A process solution containing 50 grams per liter of nickel, 0.91 gram per liter of cobalt, 0.56 gram per liter of copper and 0.0004 gram per liter of iron was treated in five extraction stages with an organic solution of 0.5 M Aliquat thiocyanate and 0.2 M Aliquat chloride in xylene using an aqueous to organic phase ratio of 20:1. After the second extraction stage the cobalt and copper in the aqueous solution had been reduced to 0.001 gram per liter and 0.0002 gram per liter, respectively, and after the third extraction stage the iron in aqueous solution had been reduced to 0.00005 gram per liter.

Another process solution containing 50 grams per liter of nickel as nickel sulfate, 50 grams per liter of sodium chloride, 15 grams per liter of boric acid, 0.8 gram per liter of copper, 0.5 gram per liter of cobalt, 0.4 gram per liter of zinc and 0.12 gram per liter of iron in the ferric state was treated in five extraction stages with an organic solution of 0.65 N Alamine hydrochloride and 0.35 N Alamine hydrothiocyanate in kerosene using an equeous to organic phase ratio of 5:1. After two extraction stages the iron in aqueous solution had been reduced to trace amounts, after the fourth extraction stage cobalt and zinc had been reduced to 0.01 and 0.015 gram per liter, respectively, and after the fifth extraction stage copper in the solution had been reduced to 0.01 gram per liter.

It is to be noted that metal contaminants can be removed from nickel process streams by the present novel process so long as they are not present in a complex cationic salt form. Thus, for example, cobalt and copper cannot be extracted when present as ammine salts.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An improved solvent extraction process for removing metal contaminants from nickel-containing process solutions which comprises treating a nickel-containing aqueous feed solution with a solution having a pH below about 6.5 containing a water-insoluble quaternary ammonium chloride, a water-insoluble quaternary ammonium thiocyanate and a water-insoluble quaternary ammonium iodide in a water-immiscible organic solvent to remove metal contaminants therefrom in a metal-bearing organic phase and leave a nickel-bearing aqueous phase and stripping metal contaminants from said metal-bearing organic phase to regenerate said water-insoluble quaternary ammonium compounds for re-use in treating further nickel process solution containing metal contaminants.

2. A process as described in claim 1 in which at least one metal contaminant from the group consisting of cobalt, iron, copper, lead and zinc is removed from the nickel-containing solution.

3. A process as described in claim 1 in which the metal-bearing organic phase is treated with an alkali to precipitate metals contained therein as hydroxides and regenerate the water-insoluble quaternary ammonium compounds.

4. A process as described in claim 1 in which the metal-bearing organic phase is treated with a water-soluble sulfide to precipitate the metals contained therein as sulfides and regenerate the water-insoluble quaternary ammonium compounds.

5. A process as described in claim 1 in which the nickel-bearing aqueous phase is treated with a solution of a water-insoluble tertiary amine in a water-immiscible organic solvent to remove thiocyanate and iodide values therefrom in a thiocyanate- and iodide-bearing organic phase and leave a substantially thiocyanate- and iodide-free nickel-containing aqueous solution and said thiocyanate- and iodide-bearing organic phase is treated with an alkali to regenerate tertiary amine in water-immiscible organic solvent and form an aqueous phase containing thiocyanate and iodide anions.

6. A process as described in claim 1 in which the nickel-bearing aqueous phase is treated with an aqueous solution of cuprous chloride to remove thiocyanate and iodide values therefrom as a cuprous thiocyanate and cuprous iodide precipitate and leave a substantially thiocyanate- and iodide-free nickel-containing aqueous solution and said cuprous thiocyanate and cuprous iodide precipitate is treated with an alkali to form cuprous hydroxide and an aqueous solution containing thiocyanate and iodide anions.

7. An improved solvent extraction process for removing metal contaminants from nickel-containing process solutions which comprises treating a nickel-containing aqueous feed solution with a solution having a pH below about 6.5 of a water-insoluble quaternary ammonium thiocyanate in a water-immiscible organic solvent to remove metal contaminants therefrom in a metal-bearing organic phase and leave a nickel-bearing aqueous phase and stripping metal contaminants from said metal-bearing organic phase with a stripping agent from the group consisting of water-soluble sulfides and alkalis to regenerate said quaternary ammonium thiocyanate for re-use in treating further nickel process solution containing metal contaminants.

8. A process as described in claim 7 in which the solution of quaternary ammonium thiocyanate in organic solvent also contains a water-insoluble quaternary ammonium chloride to reduce dissolution of thiocyanate values in the nickel-containing aqueous solution being treated.

9. An improved solvent extraction process for removing metal contaminants from nickel-containing process solutions which comprises treating a nickel-containing aqueous feed solution having a pH below about 6.5 with a solution of a water-insoluble quaternary ammonium chloride in a water-immiscible organic solvent to remove metal contaminants therefrom in a metal-bearing organic phase and leave a nickel-bearing aqueous phase and stripping metal contaminants from said metal-bearing organic phase with a stripping agent from the group consisting of water-soluble sulfides and alkalis to regenerate said quaternary ammonium chloride for re-use in treating further nickel process solution containing metal contaminants.

10. An improved solvent extraction process for removing metal contaminants from nickel-containing process solutions which comprises treating a nickel-containing aqueous feed solution having a pH below about 6.5 with a solution of a water-insoluble quaternary ammonium iodide in a water-immiscible organic solvent to remove metal contaminants therefrom in a metal-bearing organic phase and leave a nickel-bearing aqueous phase and striping metal contaminants from said metal-bearing organic phase with a stripping agent from the group consisting of water-soluble sulfides and alkalis to regenerate said quaternary ammonium iodide for re-use in treating further nickel process solution containing metal contaminants.

11. An improved solvent extraction process for removing metal contaminants from nickel-containing process solutions which comprises treating a nickel-containing aqueous feed solution having a pH below about 6.5 and containing at least one metal contaminant from the group consisting of cobalt, iron, copper, lead and zinc with a solution of at least one water-insoluble extractant selected from the group consisting of the quaternary ammonium chlorides, thiocyanates, iodides, bromides, nitrites, azides, tungstates and molybdates in a water-immiscible organic solvent to remove metal contaminants therefrom in a metal-bearing organic phase and to maintain the nickel in the aqueous phase, stripping metal contaminants from said metal-bearing organic phase with a stripping agent and regenerating said extractant for re-use in treating further nickel process solution containing metal contaminants.

12. An improved solvent extraction process for removing arsenic from metal-containing process solutions which comprises treating a nickel-containing aqueous feed solution having a pH below about 6.5 and containing arsenic as a metal contaminant with a solution of a water-insoluble quaternary ammonium tungstate in a water-immiscible organic solvent to remove arsensic therefrom in an arsenic-bearing organic phase and leave a nickel-bearing aqueous phase and said arsenic-bearing organic phase is treated with a stripping agent from the group consisting of water-soluble sulfides and alkalis to remove arsenic contained therein and to regenerate quaternary ammonium tungstate.

13. An improved solvent extraction process for removing arsenic from metal-containing process solutions which comprises treating a nickel-containing aqueous feed solution having a pH below about 6.5 and containing arsenic as a metal contaminant with a solution of a water-insoluble quaternary ammonium molybdate in a water-immiscible organic solvent to remove arsenic therefrom in an arsenic-bearing organic phase and leave a nickel-bearing aqueous phase and said arsenic-bearing organic phase is treated with a stripping agent from the group consisting of water-soluble sulfides and alkalis to remove arsenic contained therein and to regenerate quaternary ammonium molybdate.

14. An improved solvent extraction process for removing metal contaminants from nickel-containing process solutions which comprises treating a nickel-containing aqueous feed solution having a pH below about 6.5 and containing at least one metal contaminant from the group consisting of iron, copper, lead and zinc with an extractant solution of at least one salt from the group consisting of chloride, thiocyanate, bromide, azide and iodide salts of a water-insoluble amine in a water-immiscible organic solvent to remove said metal contaminants therefrom in a metal-bearing organic phase and to maintain the nickel in the aqueous phase, stripping metal contaminants from said metal-bearing organic phase, and regenerating said amine for re-use in treating further nickel process solution containing metal contaminants.

15. A process as described in claim 14 in which the nickel-containing aqueous feed solution is treated with thiocyanate and iodide salts of a tertiary amine and the nickel-bearing aqueous phase is treated with an aqueous solution of cuprous chloride to remove thiocyanate and iodide values therefrom as a cuprous thiocyanate and cuprous iodide precipitate and leave a substantially thiocyanate- and iodide-free nickel-bearing aqueous solution and said cuprous thiocyanate and cuprous iodide precipitate is treated with an alkali to form cuprous hydroxide and an aqueous solution containing thiocyanate and iodide anions.

16. A process as described in claim 14 in which the nickel-containing aqueous feed solution is treated with thiocyanate and iodide salts of a tertiary amine and the nickel-bearing aqueous phase is treated with a solution of a water-insoluble tertiary amine in a water-immiscible organic solvent to remove thiocyanate and iodide values therefrom in a thiocyanate- and iodide-bearing organic phase and leave a substantially thiocyanate- and iodide-free nickel-bearing aqueous solution and said thiocyanate- and iodide-bearing organic phase is treated with an alkali to regenerate tertiary amine in water-immiscible organic solvent and form an aqueous phase containing thiocyanate and iodide anions.

17. A process as described in claim 16 in which the regenerated tertiary amine stream is equilibrated with acid to prevent any acid loss from the nickel containing aqueous feed solution.

18. An improved solvent extraction process for removing metal contaminants from nickel-containing process solutions which comprises treating a nickel-containing aqueous feed solution having a pH below about 6.5 and containing cobalt as a metal contaminant with an extractant solution containing a thiocyanate salt of a water-insoluble amine in a water-immiscible organic solvent to remove said cobalt contaminant therefrom in a metal-bearing organic phase and to maintain the nickel in the aqueous phase, stripping cobalt from said metal-bearing organic phase, and regenerating said amine for re-use in treating further nickel process solution containing metal contaminants.

19. An improved solvent extraction process for removing metal contaminants from nickel-containing process solutions which comprises treating a nickel-containing aqueous feed solution having a pH below about 6.5 and containing cobalt as a metal contaminant with an extractant solution containing a thiocyanate salt of a water-insoluble tertiary amine in a water-immiscible organic solvent to remove said cobalt contaminant therefrom in a metal-bearing organic phase and to maintain the nickel in the aqueous phase, stripping cobalt from said metal-bearing organic phase, and regenerating said tertiary amine for re-use in treating further nickel process solution containing metal contaminants.

References Cited by the Examiner

UNITED STATES PATENTS

| 2,877,250 | 3/59 | Brown | 23—312 |
| 3,006,719 | 10/61 | Miller | 23—312 |
| 3,069,231 | 12/62 | Hard | 75—119 |
| 3,083,076 | 3/63 | Drobnick | 23—312 |
| 3,128,156 | 4/64 | Long | 75—119 |

OTHER REFERENCES

Sharp et al., Journal of the American Chemical Society, vol. 77, 1955, pp. 6519–6521.

West et al., Metallurgia, May 1956, pp. 234–236, July 1956, pp. 47–51.

DAVID L. RECK, *Primary Examiner.*

BENJAMIN HENKIN, *Examiner.*